United States Patent [19]

Bielfeldt

[11] Patent Number: 5,096,636
[45] Date of Patent: Mar. 17, 1992

[54] HIGH-SPEED HYDRAULIC PRESS

[75] Inventor: Friedrich B. Bielfeldt, Eppingen, Fed. Rep. of Germany

[73] Assignee: Maschinenfabrik J. Dieffenbacher GmbH & Co., Eppingen, Fed. Rep. of Germany

[21] Appl. No.: 670,525

[22] Filed: Mar. 18, 1991

Related U.S. Application Data

[63] Continuation of Ser. No. 113,812, Oct. 28, 1987, abandoned.

[30] Foreign Application Priority Data

Nov. 4, 1986 [DE] Fed. Rep. of Germany ....... 3637544

[51] Int. Cl.$^5$ ............................................. B29C 43/00
[52] U.S. Cl. .................................. 264/40.5; 264/325; 425/150; 425/419; 425/451.2; 425/451.9
[58] Field of Search ............... 264/40.5, 325; 425/149, 425/150, 405.2, 406, 408, 419, 450.1, 451.2, 451.9, 453, 589, 590, DIG. 221, DIG. 223

[56] References Cited

U.S. PATENT DOCUMENTS

| | | | |
|---|---|---|---|
| 3,418,692 | 12/1968 | Valyi | 425/451.2 |
| 3,465,387 | 9/1969 | Allard et al. | 425/149 |
| 3,505,708 | 4/1970 | Moslo | 425/161 |
| 4,076,780 | 2/1978 | Ditto | 264/325 |
| 4,304,540 | 12/1981 | Hammon | 425/451.2 |
| 4,457,684 | 7/1984 | Gram | 425/451.9 |
| 4,470,787 | 9/1984 | Gram | 425/150 |
| 4,552,524 | 11/1985 | Schmidts et al. | 425/451.2 |
| 4,565,517 | 1/1986 | Brinkmann et al. | 425/451.9 |
| 4,693,448 | 9/1987 | Proksa et al. | 425/451.2 |
| 4,696,632 | 9/1987 | Inaba | 425/451.2 |

Primary Examiner—Jay H. Woo
Assistant Examiner—C. Scott Bushey
Attorney, Agent, or Firm—Foley & Lardner

[57] ABSTRACT

A high-speed hydraulic press of frame design, with press platen, crosshead and a press ram movable between these, for the forming, coating and pressing of large-surface pieces of material of small wall thickness made from plastic or plastic composite materials or of fiber-reinforced plastic boards into moldings, with a press ram which carries the upper mold half and which can be raised and lowered by means of a hydraulic rapid-motion arrangement for the idle stroke and a hydraulic short-stroke arrangement for the working storage.

15 Claims, 3 Drawing Sheets

HIGH-SPEED HYDRAULIC PRESS

This application is a continuation of application Ser. No. 07/113,812, filed Oct. 28, 1987 now abandoned.

The invention relates to a high-speed hydraulic press. In the forming, coating and pressing of large-surface pieces of material of small wall thickness made from plastic, of plastic composite materials or of fiber-reinforced plastic boards into moldings, extremely rigid presses with great pressing accuracy and a high pressing force are necessary. In automobile construction too, there has been a tendency to produce relatively large moldings, such as vehicle doors, vehicle roofs, etc., hitherto made of sheet steel, from plastic or from plastic composite materials. Many new plastics and plastic combinations possessing the requisite properties have been developed for this purpose. However, fiber-reinforced plastic boards or plastic panels, which are compressed and deformed in the cold or heated state in the press, can also be used as a starting material. In particular, the shaping of large-surface body parts of extremely small wall thickness makes it necessary to guide the moldings exactly parallel, to avoid any regions of varying thickness in the workpiece.

Hydraulic presses for meeting these requirements are known from German Offenlegungsschrift 3,207,242.

In order to satisfy the stringent requirements described above, such a press is composed of a high upper press spar adjustable on long lateral round columns and serving as a press platen, and of a press bottom part of unfavorably high construction, comprising a lower press spar with attached press cylinders and a press platen. In this press, the upper press spar initially clamped to the round columns is released and drawn into the lower working position along the round columns. The upper press spar is subsequently clamped to the round columns once again, after which the lower mold half, together with a lower press spar, is pressed upwards against the piece of material by means of the hydrostatically mounted press cylinders, for the purpose of compression and deformation. Because it is indispensable to ensure a large predetermined play in order to guide the upper press spar on the round columns, it is scarcely possible to achieve the desired accuracy in the parallel guidance and adjustment of the mold halves.

However, further development, in terms of processes and materials, in the processing of thermosetting and thermoplastic fiber-reinforced materials also requires:

a) extremely short pressureless dwell times for the relatively highly accelerated thermosetting material (for example, polyester resins for large SMC moldings) or preheated thermoplastics which are placed in the cold die, b) short pressure build-up times, in order to achieve a full-molding-time of less than 1 second from material contact (between the male mold and female mold) to full molding.

It is a prerequisite for parts of perfect quality that the conditions according to a) and b) be satisfied, in order to guarantee full molding even when the flow distances are long and the flow cross-sections narrow, for example in the event of prehardening or too rapid cooling of the not yet fully molded material or, where b) is concerned, if the materials are quick-reacting.

In addition to this requirement profile applicable to the so-called "plastic forging", it is also necessary, for the purpose of a high accuracy of the moldings produced and a uniform dimensional stability or an appropriate uniformly thin surface coating in the die itself, that c) exact parallel alignment be guaranteed within very narrow limits (measured against the 4 corner points of the press platen) during the rapid descent of the press ram and during the actual pressing operation.

SUMMARY OF THE INVENTION

The object on which the invention is based is to provide a high-speed hydraulic press which, whilst meeting the abovementioned three requirements a), b) and c, also makes it possible to achieve extremely short press cycles.

Advantageous developments and improvements of the high-speed press are possible as a result of the measures and features hereinafter described.

The advantages afforded by means of the invention are, in particular, that impact-free and wear-free coupling is achieved in practice, even with low effective masses, as a result of the non-positive clamping of the pressure rods which is in synchronism with the travel, this being possible from the technical point of view by means of the hydraulic damping and automatic compensation of the connected masses in the prestressed pressure cushions. The neutralization of the weight of the pressure rods and of the pistons advantageously promote (sic), as a result of the low masses remaining, shorter braking times, a higher speed over the idle-stroke distance which can be covered, and high closing speeds.

This ensures extremely short dwell times of the material to be shaped from insertion into the male mold up to the start of the molding, and consequently greater deformability right into the outermost corners of the workpiece.

It is also advantageous that, as a result of the control and regulating measures and the constructive designs, accuracy of parallel running is guaranteed as early as when the female mold is introduced into the guides and insertion edges of the male mold before the start of material contact.

Combining the hydraulic collet-locking system with the hydraulic short-stroke cylinder/piston arrangement into a single constructive unit is also advantageous for short pressure build-up times, the use of short-stroke cylinders making it possible to achieve particularly high press speeds. With short-stroke cylinder/piston arrangements, the energy consumption required and the quantities of oil to be controlled and regulated are also very small, and because of the small volume of oil in the cylinders the pressure build-up time is very short as a result of the low compression volume of the head of oil, that is to say the quantity of oil to be compressed is approximately 20 times less than in a fully hydraulic system. Smaller moved quantities of oil in turn assist an exact numerically controlled movement of the press plunger during the closing and pressing stroke within the narrow tolerance range of the "desired-value/actual-value deviation" in accordance with the predetermined speed, braking-travel and press-force profile.

In comparison with other known short-stroke press systems, in the high-speed press according to the invention there is no need for expensive controls for continuous plunger movement and for synchronous movement between plunger and press-force system.

As a consequence, the high-speed press according to the invention results in a shorter press cycle for the workpiece to be produced and consequently a higher output, at the same time ensuring higher quality and less waste, and a longer life of the dies as a result of the care taken of the insertion edges.

BRIEF DESCRIPTION OF THE DRAWINGS

An exemplary embodiment of the invention is illustrated in the drawing and described in detail below.

In the drawing.

DESCRIPTION OF THE PREFERRED EMBODIMENTS

Figure 2:
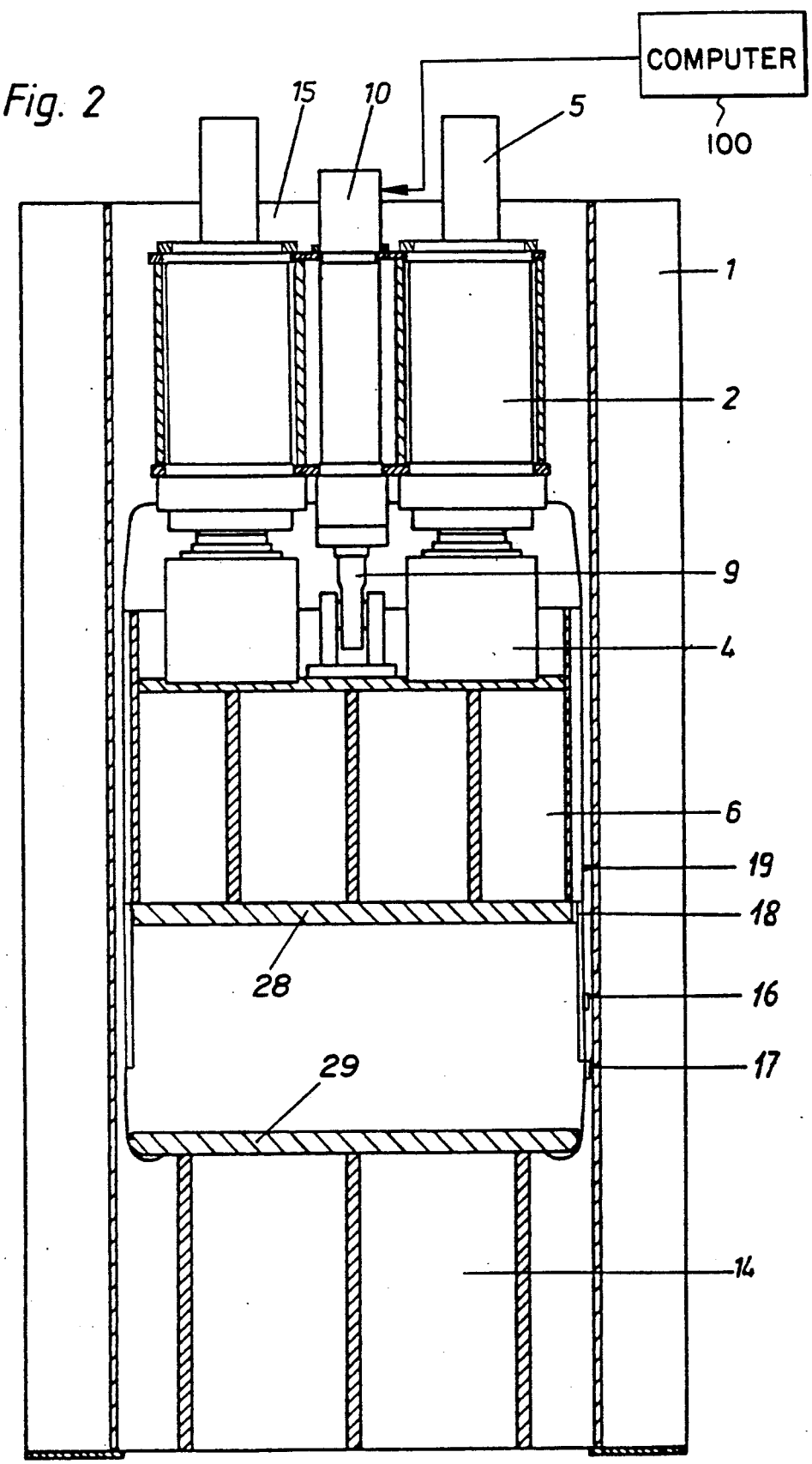
FIG. 2 shows the high-speed press according to the invention in elevation and in section.

The exemplary embodiment according to FIG. 2 illustrates a high-speed hydraulic press of window-frame design, composed of the press frame 1 with the upper cross head 15 and the press platens 14. Between the crosshead 15 and the press platen 14 is arranged the press ram 6 which carries the upper die half or female mold 28 and which can be raised and lowered by means of the hydraulic rapid-motion drive 9 and 10. The rapid-motion drive is composed of the plunger 9 fastened centrally to the press ram 6 and of the hydraulic cylinder/piston arrangement 10 anchored in the crosshead 15. The press ram 6 is fastened to pressure rods 5, which are guided in the crosshead 15 and of which there are two or four (depending on the type of press). The hydraulic collet-locking system 3, 7 and 13 and the hydraulic pressing-force cylinder/piston arrangement 2, 4, 8, 11 and 12 connected operatively to it constitute, with the pressure rods 5, a single constructive unit.

The exemplary embodiment according to FIG. 2 shows a high-speed hydraulic press of window-frame design, composed of the press frame 1 with the upper crosshead 15 and the press platen 14. Between the crosshead 15 and the press platen 14 is arranged the press ram 6 which carries the upper die half or female mold 28 and which can be raised and lowered by means of the hydraulic rapid-motion drive 9 and 10. The rapid-motion drive comprises the plunger 9 fastened centrally to the press ram 6 and the hydraulic cylinder/piston arrangement 10 anchored in the crosshead 15. The press ram 6 is fastened, with the short-stroke cylinder arrangement 4, 8, 11 and 12 interposed, to pressure rods 5 which are guided in the crosshead 15 and of which there are two or four (depending on the type of press). The hydraulic collet-locking system 2, 3, 7 and 13 and the short-stroke cylinder arrangement 4, 8, 11 and 12 connected operatively to it constitute, with the pressure rods 5, a single constructive unit, the pressure rods 5 being made into pistons 8 on their end face.

Figure 1:
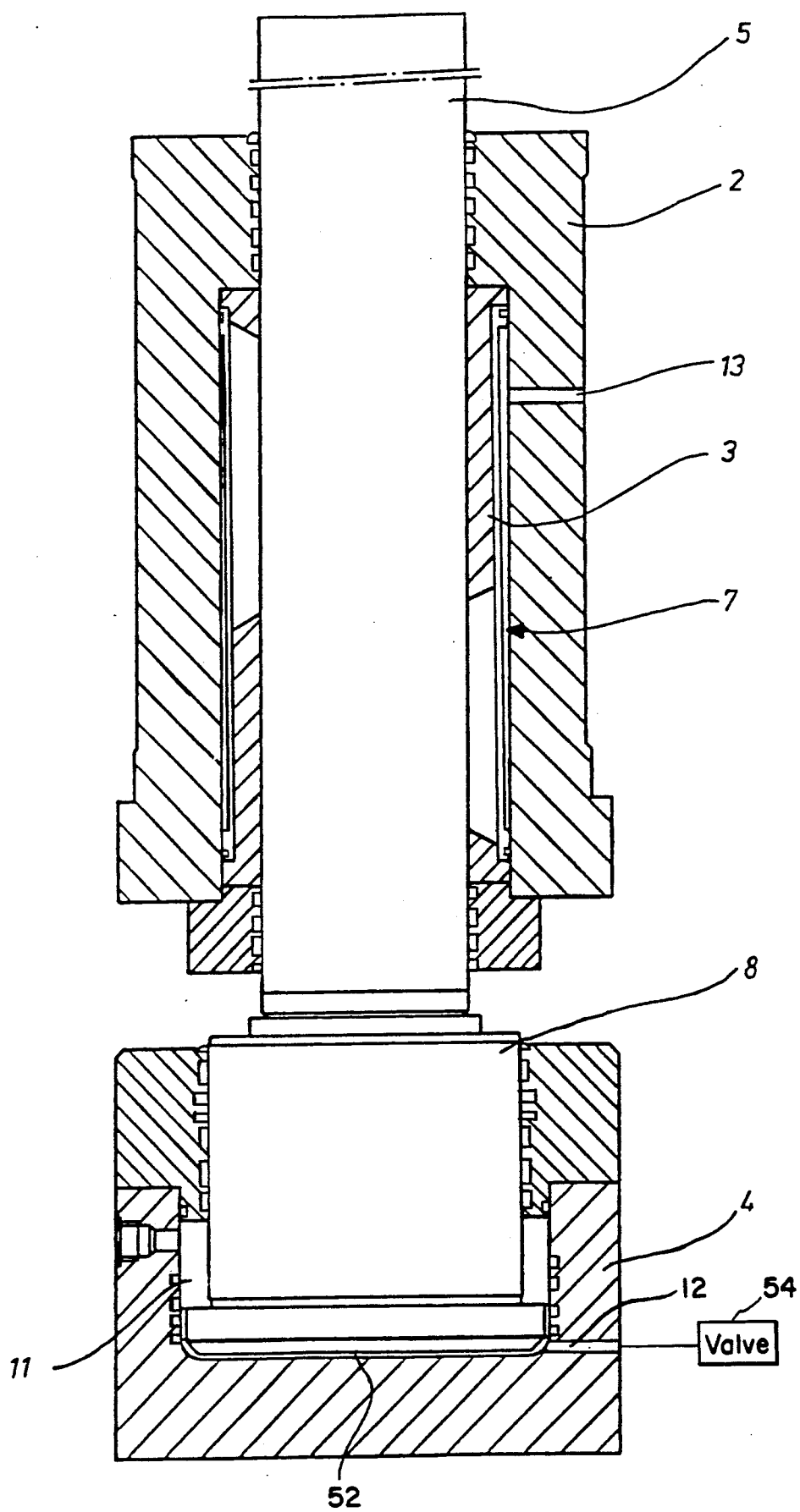
FIG. 1 shows, in elevation and in section, the hydraulic collet-locking system and the short-stroke cylinder/piston arrangement of the high-speed press according to the invention.

FIG. 1 shows, in section, the arrangement of a pressure rod 5 with the hydraulic collet-locking system 2, 3, 7 and 13 and the hydraulic short-stroke cylinder arrangement 4, 8, 11 and 12 for the pressing force. When a pressing medium is introduced into the feedline 13, the diaphragm 7 consequently exerts pressure on the collet 3, and the pressure rod 5 is locked non-positively by means of the cylinder 2. Since the cylinders 2 are anchored in the crosshead 15, the pressure rods 5 are therefore also connected to this. Even at the very start, or before the descent of the press ram 6, pressure medium is introduced into the pressure cushions 11 from a pressure accumulator, in order to generate in these a compressive prestress sufficient to compensate the weight of all the pressure rods 5 and all the pistons 8 relative to the crosshead 15. Thus, locking the pressure rods 5 to the crosshead 15 in synchronism with the travel ensures impact-free absorption of the masses moved. After locking, the pressing force necessary for the pressing operation is exerted by introducing further pressure medium into the cylinder space via the feedline 12, the pistons 8 pressing the press ram 6 with the female mold 28 against the male mold 29 and the press platen 14.

At the start of a press cycle, the collet-locking system 2, 3, 7 and 13 is released, with the plunger 9 in the upper position. At the beginning of the controlled downward movement by means of the hydraulic cylinder/piston arrangement 10, the pressure rods 5 descend together with the press ram 6 and the female mold 28. Immediately before the two die halves, namely the female mold 28 and male mold 29, touch one another, when the counter-contact 18 comes up against the stop 16, the downward movement of the press ram 6 and of the pressure rods 5 connected positively to it is braked. For coupling in synchronism with the travel, the relatively low mass of the pistons 8 and of the pressure rods 5 connected positively to them needs simply be accelerated towards the pressure cushion 11, slightly prestressed according to the deadweight, from the speed $V=0$ mm/sec to the braking-travel speed of the press ram 6. Non-positive coupling by means of the collet-locking system 3, 7 and 13 can thus take place in a damped manner, without interrupting the movement of the press ram, and impact-free for the mass of the piston 8 and of the pressure rods 5. When the counter-contact 18 touches the stop 17, the build-up of the pressing force begins and the parallel alignment control is started. A servo-controlled switching valve 54 reacting proportionally to the volume of pressure medium supplied is assigned directly as an actuator to each cylinder 4. The mechanical stops 16 and 17 are fastened adjustably in the guide rails 19, so that moldings 31 of different thicknesses can be produced. The traveling motion of the plunger 9 can also be controlled and regulated via a central timing and/or path-measuring system via a numerically controlled computer system 100.

Figure 3:
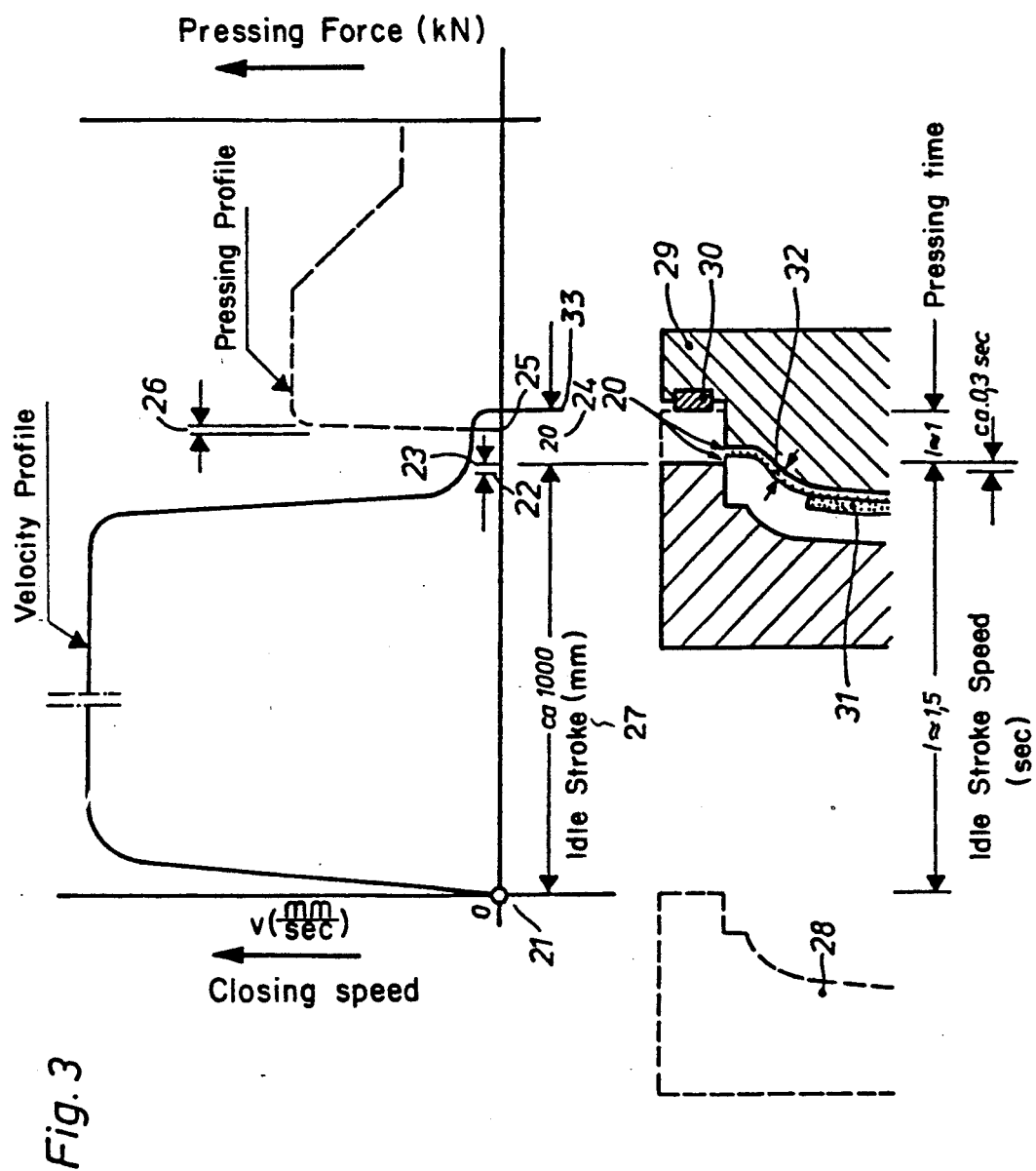
FIG. 3 shows a path/time/pressure diagram for the high-speed press according to FIG. 2.

FIG. 3 shows in a path/time/pressure diagram, with the moldings 28 and 29 represented diagrammatically, the production cycle according to the invention for a workpiece 31 from the starting of the plunger 9 at 21 to the end of the compression time at 33. The plunger stroke is plotted on the abscissa and the closing speed is plotted on the ordinate. On the speed profile curve, 22 denotes the start and 23 the end of coupling between the cylinder 2 and the pressure rods 5. Parallel alignment control begins at 23 at the same time. Whilst the start of material contact is indicated at 25, the arrows at 26 show the short pressure build-up time as a result of the short-stroke design of the cylinders 4. After the pressure build-up 26, the actual pressing force also begins at 25, as represented by a pressure profile on the right. At the very bottom, the arrowed limitations "idle stroke" and "press stroke" with pressure build-up time show the length of time of one press cycle, the time of locking or coupling of the pressure rods 5 also being indicated as 0.3 second. 27 denotes the necessary idle stroke as free space for the feed and extraction robot. The rapid plunger movement at the closing speed of approximately 1000 mm/sec is executed, shortly before contact with the insertion edges 20, over an exactly predetermined speed and braking-travel profile. 24 designates the path in the assumed example for a parallel-aligned press stroke up to the end of the molding of the pressing material or molding 31 to the thickness 32.

I claim:

1. A process for operating a high-speed press comprising a press platen and a stationary crosshead, said process comprising the steps of:
   a) rapidly lowering a press ram which is movable hydraulically between said platen and said crosshead from a raised position to a lowered position in rapid motion between idle and working strokes, said press ram carrying an upper mold half;
   b) guiding said press ram centrally in said crosshead in a sliding manner via pressure rods;
   c) applying a counter-pressure to a plurality of short stroke cylinders, each of said short stroke cylinders being fastened to the top of the press ram and cooperating with a plunger piston which is disposed on the end of one of said pressure rods, thereby prestressing said plunger pistons, said counter-pressure being greater than the total weight of all pressure rods and plunger pistons; then
   d) coupling said pressure rods to said annular cylinders, via a hydraulic collet-locking system, after said idle stroke in synchronism with the movement of said press ram; and then
   e) actuating said short-stroke cylinders to execute said working stroke.

2. The process according to claim 1, wherein said steps c), d), and e) are performed in series while maintaining parallel alignment of said press ram in response to synchronous volumatic control of the hydraulic fluid in said short stroke cylinders.

3. The according to claim 2, wherein said step c) comprises the step of applying hydraulic fluid to a plurality of pressure cushions, each of which comprises a chamber, located above at least a portion of said plunger piston, into which said hydraulic fluid is selectively introduced, and wherein said step e) comprises the step of introducing hydraulic fluid into a cylinder space disposed between a lower face of said plunger piston and an inner surface of said short stroke cylinder.

4. A high-speed hydraulic press comprising:
   a) a press platen,
   b) a crosshead,
   c) at least one annular cylinder anchored in said crosshead,
   d) a press ram movable hydraulically between said platen and said crosshead and adapted to be raised and lowered in rapid motion between idle and working strokes,
   e) an upper mold half carried by said press ram,
   f) means for rapidly moving said press ram upwardly and downwardly during said idle stroke,
   g) means, including pressure rods, for guiding said press ram centrally in said crosshead in a sliding manner,
   h) a hydraulic collet-locking system,
   i) means for coupling the pressure rods to the annular cylinders anchored in the crosshead after the idle stroke via said hydraulic collet locking system in synchronism with the movement of said press ram,
   j) means for executing said working stroke of said press ram comprising at least one short stroke cylinder fastened to the top of the press ram,
   k) at least one plunger piston on the end of each pressure rod, and
   l) pressure cushions connected to said short stroke cylinders, said pressure cushions including means for providing counter-pressure to said plunger piston before locking which is greater than the total weight of all pressure rods and plunger pistons, thereby prestressing said pressure rod.

5. A high speed hydraulic press according to claim 4, wherein said hydraulic collet-locking system, said hydraulic short-stroke cylinder and related pressure rods and pistons comprise a single, unitary structural unit.

6. A high-speed hydraulic press according to claim 4, further comprising
   guide rails for the press ram, said guide rails having continuously adjustable mechanical contacts;
   sensing and measuring means for activating, controlling and initiating, in series,
   (a) the central compressive prestress in the pressure cushions,
   (b) the hydraulic collet-locking system, and
   (c) the pressure build-up in the short stroke cylinders, while maintaining parallel alignment of the press ram in response to synchronous volumatic control of the hydraulic fluid in the short stroke cylinders.

7. A high-speed hydraulic press according to claim 4, further comprising a numerically controlled computer system for activating said means for rapidly moving said press ram in said idle stroke over a predetermined speed and breaking travel profile.

8. A high-speed hydraulic press according to claim 6, further comprising a proportionally reacting servo-controlled switching valve which actuates each short stroke cylinder for parallel alignment control.

9. A high-speed hydraulic press according to claim 4, wherein each of said pressure cushions comprises a chamber, located above at least a portion of said plunger piston, into which hydralic fluid is selectively introduced, and wherein a cylinder space is disposed between a lower face of said plunger piston and an inner surface of said short stroke cylinder, and wherein said working stroke of said press ram is executed by introducing hydraulic pressure into said cylinder space.

10. The high-speed press according to claim 6, wherein said sensing and measuring means comprises a stop and a counter contact which is connected to said press ram.

11. A high-speed hydraulic press comprising:
   a) a press platen;
   b) a stationary crosshead;
   c) at least one annular cylinder anchored in said crosshead;
   d) a press ram which is movable hydraulically between said platen and said crosshead from a raised position to a lowered position in rapid motion between idle and working strokes of said press;
   e) an upper mold half carried by said press ram;
   f) an actuator which rapidly moves said press ram downwardly during said idle stroke;
   g) pressure rods for guiding said press ram centrally in said crosshead in a sliding manner;
   h) a hydraulic collet-locking system which couples said pressure rods to said annular cylinders after said idle stroke in synchronism with the movement of said press ram;

i) a plurality of short stroke cylinders which are fastened to the top of the press ram and which execute said working stroke of said press ram;

j) a plurality of plunger pistons, each of said plunger pistons being disposed on the end of one of said pressure rods and being received within one of said short stroke cylinders; and k) hydraulic pressure cushions, each of which is connected to one of said plunger pistons, said pressure cushions providing a counter-pressure which is greater than the total weight of all pressure rods and plunger pistons, thereby prestressing said plunger pistons.

12. A high-speed hydraulic press according to claim 11, further comprising guide rails for said press ram, said guide rails having continuously adjustable mechanical contacts;

sensing and measuring means for activating, controlling and initiating, in series, (a) said counter-pressure in said pressure cushions,
(b) said hydraulic collet-locking system, and
(c) said pressure build-up in the short stroke cylinders, while maintaining parallel alignment of said press ram in response to synchronous volumatic control of the hydraulic fluid in said short stroke cylinders.

13. A high-speed hydraulic press according to claim 12, further comprising a proportionally reacting servo-controlled switching valve which actuates each short stroke cylinder for parallel alignment control.

14. A high-speed hydraulic press according to claim 11, wherein each of said pressure cushions comprise a chamber, located above at least a portion of said plunger piston, into which hydraulic fluid is selectively introduced, and wherein a cylinder space is disposed between a lower face of said plunger piston and an inner surface of said short stroke cylinder, and wherein said working stroke of said press ram is executed by introducing hydraulic pressure into said cylinder space.

15. The high-speed press according to claim 13, wherein said sensing and measuring means comprises a stop and a counter-contact which is connected to said press ram.

* * * * *